(12) United States Patent
Li et al.

(10) Patent No.: US 10,211,665 B2
(45) Date of Patent: Feb. 19, 2019

(54) ENERGY MANAGEMENT METHOD OF MULTI-TYPE BATTERY ENERGY STORAGE POWER STATION CONSIDERING CHARGE AND DISCHARGE RATES

(71) Applicants: ZHANGJIAKOU WIND AND SOLAR POWER ENERGY DEMONSTRATION STATION CO. LTD., STATE GRID XIN YUAN COMPANY, Zhangjiakou (CN); CHINA ELECTRIC POWER RESEARCH INSTITUTE, Beijing (CN); STATE GRID CORPORATION OF CHINA, Beijing (CN)

(72) Inventors: Xiangjun Li, Beijing (CN); Dong Hui, Beijing (CN); Xiaokang Lai, Beijing (CN); Mingjie Gao, Beijing (CN); Shaoyu Liu, Beijing (CN)

(73) Assignees: ZHANGJIAKOU WIND AND SOLAR POWER ENERGY DEMONSTRATION STATION Co. LTD., STATE GRID XIN YUAN COMPANY, Zhangjiakou (CN); CHINA ELECTRIC POWER RESEARCH INSTITUTE, Beijing (CN)

( * ) Notice: Subject to any disclaimer, the term of this patent is extended or adjusted under 35 U.S.C. 154(b) by 479 days.

(21) Appl. No.: 14/909,401

(22) PCT Filed: Sep. 25, 2013

(86) PCT No.: PCT/CN2013/084149
§ 371 (c)(1),
(2) Date: Feb. 1, 2016

(87) PCT Pub. No.: WO2015/014011
PCT Pub. Date: Feb. 5, 2015

(65) Prior Publication Data
US 2016/0197514 A1 Jul. 7, 2016

(30) Foreign Application Priority Data

Jul. 30, 2013 (CN) .......................... 2013 1 0325580

(51) Int. Cl.
H02J 3/32 (2006.01)
H02J 7/04 (2006.01)
G05B 15/02 (2006.01)

(52) U.S. Cl.
CPC .............. *H02J 7/042* (2013.01); *G05B 15/02* (2013.01); *H02J 3/32* (2013.01)

(58) Field of Classification Search
USPC .................................. 700/286, 291, 295–296
See application file for complete search history.

(56) References Cited

U.S. PATENT DOCUMENTS

| 2011/0245987 A1* | 10/2011 | Pratt | ..................... H01M 10/44 700/295 |
| 2014/0347016 A1* | 11/2014 | Becker | ..................... H02J 3/32 320/136 |

OTHER PUBLICATIONS

Battery Energy Storage for Enabling Integration of Distributed Solar Power Generation. Article. [online]. Cody A. Hill, 2012[retrieved on Jun. 29, 2018]. Retrieved from internet: <URL: https://ieeexplore.ieee.org/document/6198748/> (Year: 2012).*

* cited by examiner

*Primary Examiner* — Robert E Fennema
*Assistant Examiner* — Marzia T Monty
(74) *Attorney, Agent, or Firm* — Platinum Intellectual Property LLP

(57) ABSTRACT

The present invention provides an energy management method of a multi-type battery energy storage power station considering charge and discharge rates, that includes: reading related data of the battery energy storage power station; calculating charge or discharge rate characteristic values of battery energy storage machine sets; calculating initial power command values of the battery energy storage machine sets; judging whether the initial power command values of the battery energy storage machine sets exceed the maximum allowable charge or discharge power of the machine sets in real time, if more than, online correcting and re-calculating the initial power command values of the battery energy storage machine sets; otherwise, setting the initial power command values of the energy storage machine sets as the power command values thereof; and summarizing the power command values of the battery energy storage machine sets, and outputting the same. With the reasonable control of the charge and discharge rates of the energy storage machines sets as target, the energy management method of the present invention is used for carrying out power coordinated control and energy management in the energy storage power station, and considering the service lives of energy storage batteries in the control strategy to achieve the functions of avoiding abuse of the energy storage batteries as much as possible, delaying battery aging and the like.

5 Claims, 2 Drawing Sheets

ENERGY MANAGEMENT METHOD OF MULTI-TYPE BATTERY ENERGY STORAGE POWER STATION CONSIDERING CHARGE AND DISCHARGE RATES

FIELD OF THE INVENTION

The present invention relates to the technical field of smart power grids and energy storage and conversion, particularly relates to a real-time power control method of a high-power and high-capacity megawatt battery energy storage power station considering battery charge and discharge rate properties and an energy management system thereof, and is particularly applicable to a battery power and battery energy management method of a megawatt multi-type battery energy storage power station in a large-scale wind/photovoltaic/energy storage combined power generation system.

BACKGROUND OF THE INVENTION

The national wind/photovoltaic/energy storage/transmission demonstration project is the first pilot project of the State Grid Corporation of China for constructing a strong smart grid, with "grid-friendly" new energy generation as the goal and "advancement, flexibility, demonstration and economical efficiency" as features, and the project is a renewable energy source comprehensive demonstration project having the largest scale in the world at present and integrating wind power generation, photovoltaic power generation, energy storage and transmission projects.

Wherein, the national wind/photovoltaic/energy storage/transmission demonstration project (first stage) plans to construct wind power generation 100 MW, photovoltaic power generation 40 MW and energy storage devices 20 MW (including a 14 MW lithium iron phosphate energy storage system, a 2 MW all-vanadium flow battery energy storage system and a 4 MW sodium-sulfur battery energy storage system). With the continuous development of lithium batteries and the integration technology thereof, it has become a feasible solution that a lithium battery energy storage power station is used for achieving smooth wind-photovoltaic power output, tracking planned power generation, system frequency modulation participation, peak clipping and valley filling, transient active output emergency response, transient voltage emergency support and other applications, one of the key issues is to master the energy management technology of the large-scale multi-type battery energy storage power station and a coordinated control method of multi-type large-capacity battery energy storage machine sets.

From the perspective of battery energy storage, over-charge and over-discharge will influence the service life of the battery. Therefore, it is necessary to monitor the battery charge state, reasonably allocate total power demands in the energy storage power station and control the battery charge state within a certain range.

The multi-type energy storage systems can be approximately divided into power type energy storage systems and energy type energy storage systems. At present, very few patents, literature, technical reports and the like with respect to real-time total power control and energy management based on megawatt multi-type battery energy storage power stations are available, the core technology of comprehensive control and grid-connected operation of the large-scale multi-type battery energy storage power stations need to be researched and explored in depth, and the key problems of coordinated control and energy management of the large-scale multi-type battery energy storage power stations need to be solved. In the existing power control and energy management methods of large-scale battery energy storage systems/power stations, the charge and discharge rate properties of the energy storage batteries cannot be included in constraint conditions generally to carry out energy management, therefore, sometimes, the advantage of complementary properties of different types of energy storage systems cannot be fully embodied, and the service lives of the batteries are influenced, etc.

SUMMARY OF THE INVENTION

In view of the above problems, the purpose of the present invention is to disclose an energy management method of a multi-type battery energy storage power station considering charge and discharge rates. The method is used for allocating the total power demands of the energy storage power station in real time and has the function of optimizing the working efficiency of different types of energy storage systems, in order to achieve the control purpose of prolonging the service lives of energy storage batteries.

The present invention is achieved by the following technical solution: an energy management method of a multi-type battery energy storage power station considering charge and discharge rates includes the following steps:

step 1), reading a total power demand value of the battery energy storage power station and controllable state values (when battery energy storage machine sets are controllable, the controllable state values are 1; when the battery energy storage machine sets are uncontrollable, the controllable state values are 0), battery rated capacity, state of charge values, maximum allowable discharge power and maximum allowable charge power of the battery energy storage machine sets in real time;

step 2), judging the state of each battery energy storage power station according to the total power demand value of the battery energy storage power station, and further calculating the charge or discharge rate characteristic values of the battery energy storage machine sets;

step 3) calculating initial power command values of the battery energy storage machine sets based on the charge or discharge rate characteristic values of the battery energy storage machine sets;

step 4), judging whether the initial power command values of the battery energy storage machine sets exceed the maximum allowable charge or discharge power of the machine sets in real time, if more than, online correcting and re-calculating the initial power command values of the battery energy storage machine sets; otherwise, setting the initial power command values of the battery energy storage machine sets as the power command values thereof; and step 5), summarizing the power command values of the battery energy storage machine sets, and outputting the same to the battery energy storage power station to achieve real-time power control and energy management of the battery energy storage power station.

Further, the step 2) specifically includes:

when the total power demand of the battery energy storage power station is a positive value, it indicates that the battery energy storage power station is at a discharge state, and then the discharge rate characteristic value of each battery energy storage machine set is a ratio of the maximum allowable discharge power value of the corresponding battery energy storage machine set to the battery rated capacity of the machine set;

when the total power demand of the battery energy storage power station is a negative value, it indicates that the battery energy storage power station is at a charge state, and then the charge rate characteristic value of each battery energy storage machine set is a ratio of the maximum allowable charge power value of the corresponding battery energy storage machine set to the battery rated capacity of the machine set; and when the total power demand of the battery energy storage power station is negative value, it indicates that the battery energy storage power station is at a zero power state, and then the power command values of all the battery energy storage machine sets are set as zero.

Wherein, the maximum allowable discharge power value of the controllable battery energy storage machine set is equal to a product of the controllable state value and the maximum allowable discharge power of the battery energy storage machine set; and the maximum allowable charge power value of the controllable battery energy storage machine set is equal to a product of the controllable state value and the maximum allowable charge power of the battery energy storage machine set.

Further, the step 3) specifically includes:

A) when the total power demand of the battery energy storage power station is a positive value, it indicates that the battery energy storage power station is at a discharge state, and then the initial power command value of each battery energy storage machine set is equal to multiplying a proportional value of a product of the charge state value and the discharge rate characteristic value of the corresponding battery energy storage machine set in the sum of the products of the state of charge values and the discharge rate characteristic values of all the current controllable battery energy storage machine sets by the total power demand of the battery energy storage power station;

B) when the total power demand of the battery energy storage power station is a negative value, it indicates that the battery energy storage power station is at a charge state, and then the initial power command value of each battery energy storage machine set is equal to multiplying a proportional value of a product of the discharge state value and the charge rate characteristic value of the corresponding battery energy storage machine set in the sum of the products of the state of charge values and the charge rate characteristic values of all the current controllable battery energy storage machine sets by the total power demand of the battery energy storage power station; and C) when the total power demand of the battery energy storage power station is zero, it indicates that the battery energy storage power station is at a zero power state, and the power command values of all the energy storage machine sets are directly set as zero.

Wherein, the charge state value of the controllable energy storage machine set is equal to a product of the controllable state value and the charge state value of the battery energy storage machine set; and the discharge state value of the controllable energy storage machine set is equal to a product of the controllable state value and the discharge state value of the battery energy storage machine set.

Further, the method for online correcting and re-calculating the initial power command values of the battery energy storage machine sets in the step 4) includes the following steps:

4A) initializing a counter (i.e., the counter is equal to 0), if the initial power command value of any one controllable battery energy storage machine set exceeds the maximum allowable discharge or charge power of the controllable battery energy storage machine set, adding 1 on the counter, and executing a step 4B; otherwise, skipping to a step 4E;

4B) selecting a battery energy storage machine set meeting judgment conditions from the battery energy storage machine sets counted by the counter through a greedy algorithm;

4C) setting the power command value of a corresponding energy storage machine set as the maximum allowable discharge or charge power value of the machine set;

4D) re-calculating the power command values of the energy storage machine sets not counted by the counter, and returning to the step 4A; and 4E) setting the initial power command values of all the battery energy storage machine sets as the power command values thereof.

Wherein, the initial power command value of the controllable battery energy storage machine set is equal to a product of the controllable state value and the initial power command value of the battery energy storage machine set, the maximum allowable discharge power of the controllable battery energy storage machine set is equal to a product of the controllable state value and the maximum allowable discharge power of the battery energy storage machine set, and the maximum allowable charge power of the controllable battery energy storage machine set is equal to a product of the controllable state value and the maximum allowable charge power of the battery energy storage machine set.

Further, the specific method of the step 4B is:

judgment condition J1: in the battery energy storage machine sets with the controllable state values as 1, selecting a battery energy storage machine set k having the maximum absolute value of the current maximum allowable discharge or charge power, and if only one battery energy storage machine set meets the condition, skipping to the step 4C; otherwise, continuing to execute a judgment condition J2;

judgment condition J2: selecting an energy storage machine set k having the maximum charge state value (when the total power demand of the battery energy storage power station is a positive value) or the minimum charge state value (when the total power demand of the battery energy storage power station is a negative value) from the energy storage machine sets meeting the judgment condition J1, and if only one energy storage machine set meets the condition, skipping to the step 4C; otherwise, continuing to execute a judgment condition J3; and judgment condition J3: selecting an energy storage machine set k having the maximum discharge or charge rate characteristic value from the energy storage machine sets meeting the judgment conditions J1 and J2 at the same time.

Further, the power command values of the remaining energy storage machine sets not counted by the counter are equal to:

multiplying a proportional value of the maximum allowable discharge (or charge) power of the remaining controllable energy storage machine sets in the sum of the maximum allowable discharge (or charge) power of all the current controllable energy storage machine sets not counted by the counter by a difference between the current total power demand of the battery energy storage power station and the sum of the maximum allowable discharge (or charge) power of all the battery energy storage machine sets counted by the counter.

Compared with the Prior Art, the Present Invention has the Following Beneficial Effects:

The present invention provides a real-time power control method of a megawatt multi-type battery (containing power type energy storage batteries and energy type energy storage batteries) energy storage power station, which has the advantages of being compatible with the charge and discharge rate properties and charge states of different types of energy storage systems to prolong the service lives of the energy storage batteries, the method mainly combines the allowable charge and discharge capability (i.e., the maximum allowable discharge power of the battery energy storage machine sets, the maximum allowable charge power of the battery energy storage machine sets, and the like) capable of representing the real-time power properties of the battery energy storage machine sets, the charge states SOC capable of representing the energy storage properties of the battery energy storage machine sets and the rate characteristic values (i.e., the discharge rate characteristic values of the battery energy storage machine sets, the charge rate characteristic values of the battery energy storage machine sets and the like) capable of representing the working capability properties of the battery energy storage machine sets, and adopts the greedy algorithm to correct the initial charge and discharge power values of the energy storage machine sets in real time, so as to achieve real-time optimized allocation of the total power demand of the multi-type battery energy storage power station and achieve energy management and real-time control of the megawatt multi-type battery energy storage power station.

DETAILED DESCRIPTION OF THE EMBODIMENTS

The control method of the present invention can be applied to coordinated control and energy management of a multi-type lithium battery energy storage power station or a multi-type energy storage power station containing such energy storage systems as a lithium battery, a redox flow battery, a super-capacitor, sodium-sulfur battery and the like, and the control method of the present invention will be further illustrated below in detail with a multi-type lithium battery as an example, in combination with the accompanying drawings.

Figure 1:
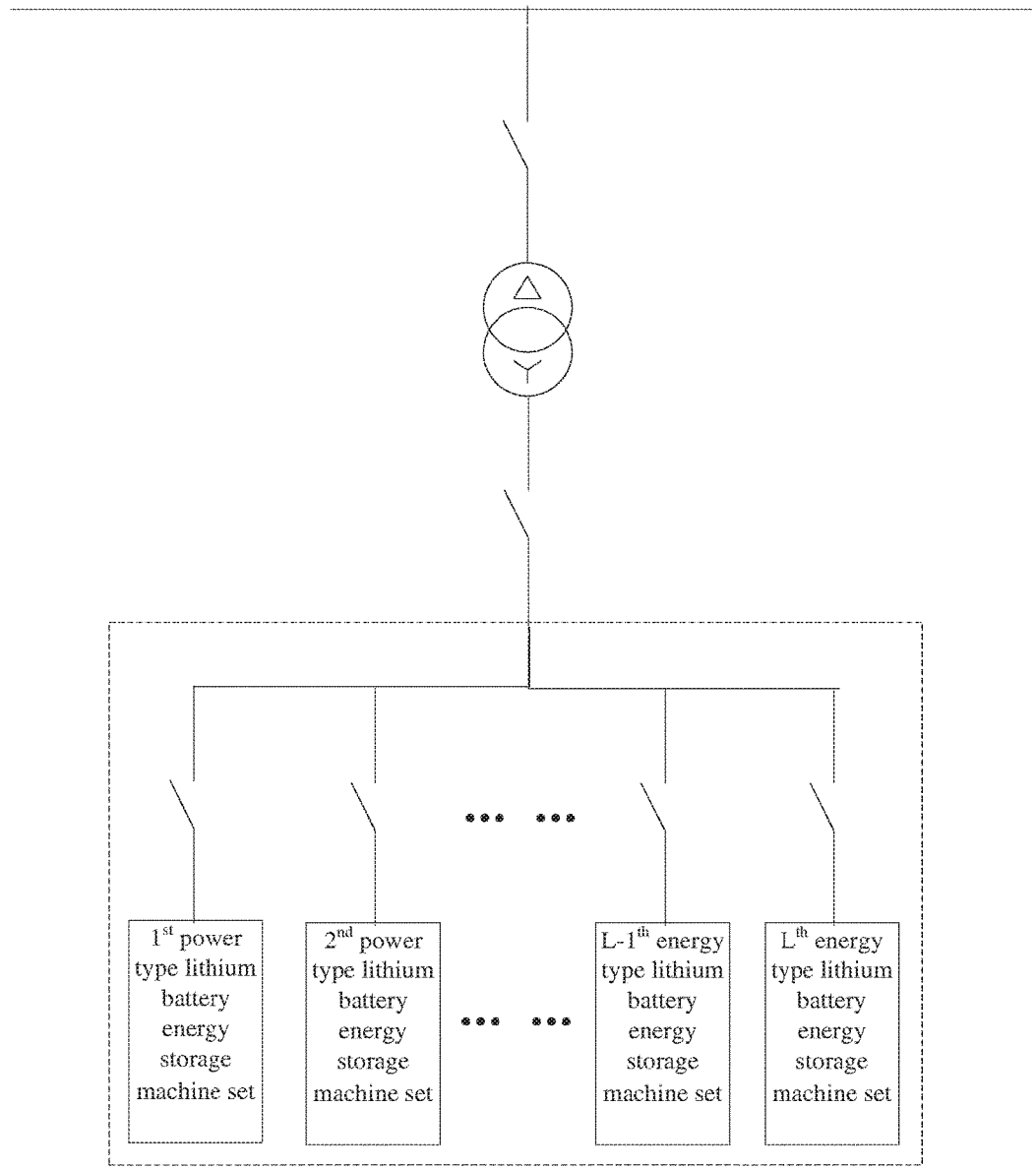
FIG. 1 is a schematic diagram of a system of an embodiment of a megawatt lithium ion battery energy storage power station.

As shown in FIG. 1, the lithium battery energy storage power station includes a bidirectional converter and a plurality of lithium battery energy storage machine sets, and the bidirectional converter can be used for executing start-stop control, charge and discharge power instruction and the like on the lithium battery energy storage machine sets.

Figure 2:
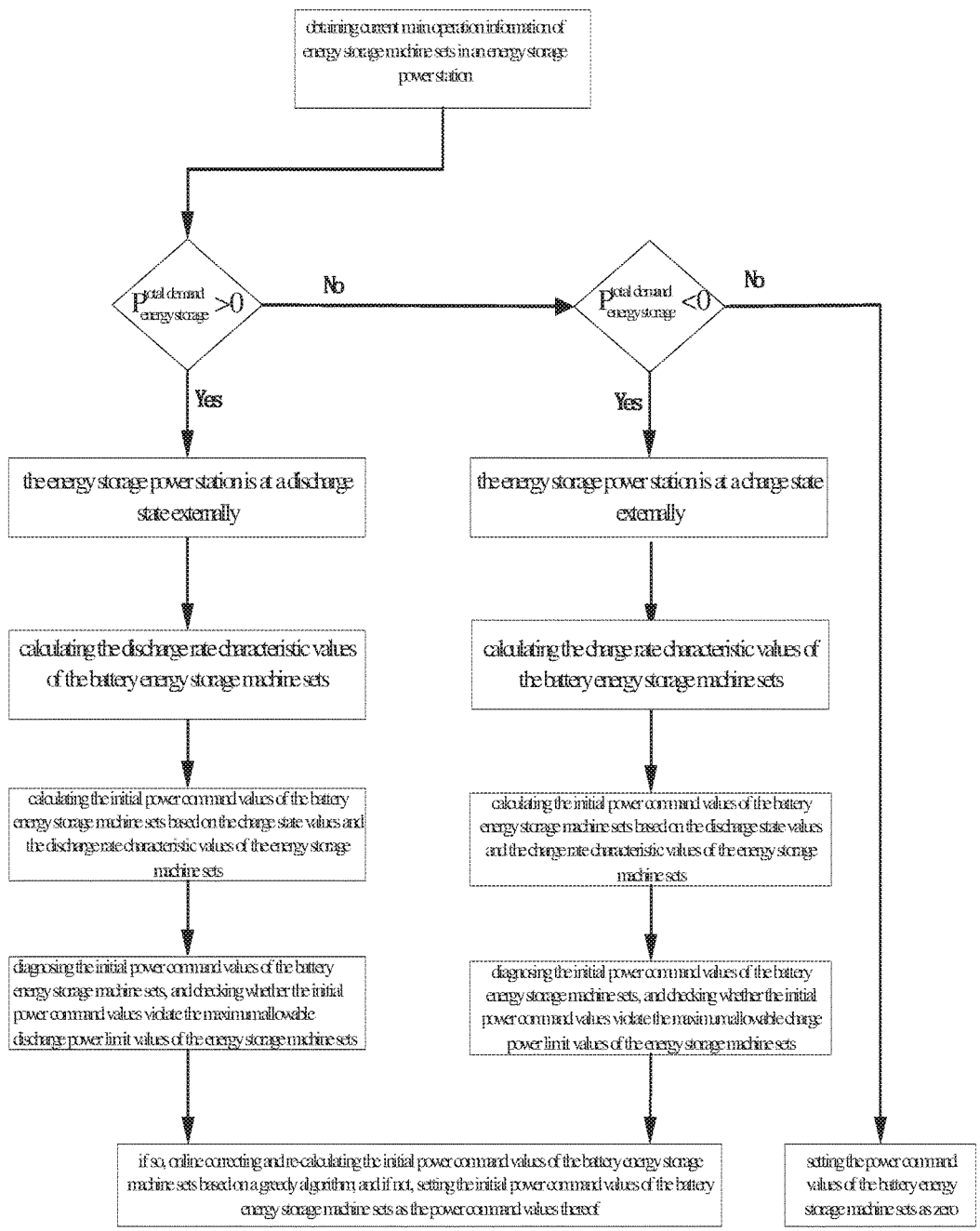
FIG. 2 is a flowchart of a coordinated control and energy management method of a multi-type energy storage power station in the present invention.

FIG. 2 shows a flowchart of a coordinated control and energy management method of a multi-type energy storage power station, and the coordinated control and energy management method specifically includes the following steps:

step 1), reading a total power demand value $P_{lithium}^{total\ demand}$ of the battery energy storage power station and controllable state values $u_i$, battery rated capacity $C_i^{bat}$, charge state values $SOC_i$, discharge state values $SOD_i$, maximum allowable discharge power $P_i^{maximum\ allowable\ discharge}$ and maximum allowable charge power $P_i^{maximum\ allowable\ charge}$ of the battery energy storage machine sets from an energy storage power station monitoring system in real time;

step 2), when the total power demand of the battery energy storage power station is a positive value, it indicates that the battery energy storage power station is at a discharge state, then calculating the discharge rate characteristic values $DR_i$ (unit:1/h) of the battery energy storage machine sets according to the battery rated capacity $C_i^{bat}$ and the maximum allowable discharge power $P_i^{maximum\ allowable\ discharge}$ of the battery energy storage machine sets through the following formula (1):

$$DR_i = \frac{P_i^{maximum\ allowable\ discharge}}{C_i^{bat}} \quad (1)$$

when the total power demand of the battery energy storage power station is a negative value, it indicates that the battery energy storage power station is at a charge state, then calculating the charge rate characteristic values $CR_i$ of the battery energy storage machine sets according to the battery rated capacity $C_i^{bat}$ and the maximum allowable charge power $P_i^{maximum\ allowable\ discharge}$ of the battery energy storage machine sets through the following formula (2):

$$CR_i = \frac{P_i^{maximum\ allowable\ charge}}{C_i^{bat}} \quad (2)$$

step 3), judging the current state of the battery energy storage power station at first, and calculating initial power command values of the battery energy storage machine sets in real time according to the operation states of the battery energy storage machine sets:

1) when the total power demand $P_{lithium}^{total\ demand}$ of the lithium battery energy storage power station is a positive value, it indicates that the energy storage power station is at a discharge state, then calculating the initial power command values $P_i^{initial}$ of the battery energy storage machine sets through the following formula (3):

$$P_i^{initial} = \frac{u_i SOC_i DR_i}{\sum_{i=1}^{L}(u_i SOC_i DR_i)} P_{lithium}^{total\ demand} \quad (3)$$

2) when the total power demand $P_{lithium}^{total\ demand}$ of the lithium battery energy storage power station is a negative value, it indicates that the battery energy storage power station is at a charge state, then calculating the initial power command values $P_i^{initial}$ of the battery energy storage machine sets through the following formulas (4)-(5):

$$P_i^{initial} = \frac{u_i SOC_i DR_i}{\sum_{i=1}^{L}(u_i SOC_i DR_i)} P_{lithium}^{total\ demand} \quad (4)$$

$$SOD_i = 1 - SOC_i \quad (5)$$

3) when the current total power demand $P_{lithium}^{total\ demand}$ of the battery energy storage power station is zero, it indicates that the battery energy storage power station is at a zero power state, directly setting the power command values of all the energy storage machine sets as zero;

in the above formulas (1)-(5), $u_i$ is the controllable state value of the $i^{th}$ battery energy storage machine set, the state is read by the step (1), when the battery energy storage machine set is controllable, the state value is 1, and the other values are zero; $SOC_i$ is the charge state value of the $i^{th}$ battery energy storage machine set; $SOD_i$ is the discharge state value of the $i^{th}$ battery energy storage machine set; $DR_i$ is the discharge rate characteristic value of the $i^{th}$ battery energy storage machine set; $CR_i$ is the charge rate characteristic value of the $i^{th}$ battery energy storage machine set; L is the total number of the lithium battery energy storage machine sets; $P_i^{maximum\ allowable\ discharge}$ is the maximum allowable discharge power of the $i^{th}$ battery energy storage machine set; and $P_i^{maximum\ allowable\ discharge}$ is the maximum allowable charge power of the $i^{th}$ battery energy storage machine set;

step 4), judging whether the initial power command values of the battery energy storage machine sets exceed the maximum allowable charge (or discharge) power of the machine sets in real time, and if so, online correcting and re-calculating the initial power command values of the battery energy storage machine sets; otherwise, setting the initial power command values of the battery energy storage machine sets as the power command values thereof, and the specific steps are as follows:

A, when the total power demand $P_{lithium}^{total\ demand}$ of the lithium battery energy storage power station is a positive value, it indicates that the battery energy storage power station is at a discharge state; firstly, setting a counter N=0, and then determining the power command values of the battery energy storage machine sets based on the following steps A1 to A5:

A1) judging whether the power command values of the battery energy storage machine sets exceed thresholds through the following formula (6):

$$u_i P_i^{initial} > u_i P_i^{maximum\ allowable\ discharge} \quad (i=1,\ldots,L) \quad (6)$$

when the initial power command value $P_i^{initial}$ of any one battery energy storage machine set i meets the above formula (6), setting N=N+1, and then executing a step A2; otherwise, skipping to a step A5;

A2) selecting an energy storage machine set k meeting the following judgment conditions from the battery energy storage machine sets counted by the counter through a greedy algorithm, and the specific implementation method is as follows: at first, in the battery energy storage machine sets with the controllable state values $u_i$ as 1, selecting a battery energy storage machine set k (set as a judgment condition J11) having the maximum absolute value of the current maximum allowable discharge power; if only one battery energy storage machine set meets the judgment condition J11, skipping to a step A3; otherwise, continuing to execute a judgment condition J12; then, if several energy storage machine sets simultaneously meet the judgment condition J11, selecting an energy storage machine set k (set as the judgment condition J12) having the maximum charge state value ($SOC_j$) from the energy storage machine sets meeting the condition; if only one energy storage machine set meets the judgment conditions J11 and J12 at the same time, skipping to a step A3; otherwise, continuing to execute a judgment condition J13;

finally, if several energy storage machine sets meet the judgment condition J11 and the judgment condition J12 at the same time, selecting an energy storage machine set k (set as the judgment condition J13) having the maximum discharge rate characteristic value from the energy storage machine sets meeting the above judgment conditions J11 and J12;

A3) limiting the power command value $P_k$ of the corresponding energy storage machine set k through the following formula (7):

$$P_k = P_k^{maximum\ allowable\ discharge} \quad (7)$$

A4) re-calculating the power command values $P_j$ of the remaining (L-N) lithium battery energy storage machine sets not counted by the counter based on the following formula (8), and returning to the step A1:

$$P_j = \frac{u_j P_j^{maximum\ allowable\ discharge}}{\sum_{j=1}^{L-M}(u_j P_j^{maximum\ allowable\ discharge})} \left( P_{lithium}^{total\ demand} - \sum_{i=1}^{N}(u_i P_i^{maximum\ allowable\ discharge}) \right) \quad (8)$$

A5) setting the initial power command values of all the battery energy storage machine sets as the power command values thereof.

B, when the total power demand $P_{lithium}^{total\ demand}$ of the lithium battery energy storage power station is a negative value, it indicates that the energy storage power station is at a charge state; firstly, setting the counter M=0, and then determining the power command values of the battery energy storage machine sets based on the following steps B1 to B5:

B1) judging whether the power command values of the battery energy storage machine sets exceed thresholds through the following formula:

$$|P_i^{initial}| > |P_i^{maximum\ allowable\ discharge}| \quad (9)$$

when the initial power command value $P_i^{initial}$ of any one battery energy storage machine set i meets the above formula (9), setting M=M+1, and then executing a step B2; otherwise, skipping to a step B5;

B2) selecting an energy storage machine set k meeting the following judgment conditions from the battery energy storage machine sets counted by the counter through the greedy algorithm, at first, in the battery energy storage machine sets with the controllable state values $u_i$ as 1, selecting a battery energy storage machine set k (set as a judgment condition J21) having the maximum absolute value of the current maximum allowable charge power; if only one battery energy storage machine set meets the judgment condition J21, skipping to a step B3; otherwise, continuing to execute a judgment condition J22; then, if several energy storage machine sets simultaneously meet the judgment condition J21, selecting an energy storage machine set k (set as the judgment condition J22) having the minimum charge state value from the energy storage machine sets meeting the condition; if only one energy storage machine set meets the judgment conditions J21 and J22 at the same time, skipping to a step A23; otherwise, continuing to execute a judgment condition J23;

finally, if several energy storage machine sets meet the judgment condition J21 and the judgment condition J22 at the same time, selecting a battery energy storage machine set k (set as the judgment condition J23) having the maximum charge rate characteristic value from the energy storage machine sets meeting the above judgment conditions J21 and J22;

B3) limiting the power command value $P_k$ of the corresponding energy storage machine set k through the following formula (10):

$$P_i = P_i^{maximum\ allowable\ discharge} \quad (i=1, \ldots, M) \quad (10)$$

B4) re-calculating the power command values $P_j$ of remaining (L-M) lithium battery energy storage machine sets not counted by the counter based on the following formula (11), and returning to the step B1:

$$P_j = \frac{u_j P_j^{maximum\ allowable\ charge}}{\sum_{j=1}^{L-M} \left( u_j P_j^{maximum\ allowable\ charge} \right)} \left( P_{lithium}^{totaldemand} - \sum_{i=1}^{M} \left( u_i P_i^{maximum\ allowable\ charge} \right) \right) \quad (11)$$

B5) setting the initial power command values of all the battery energy storage machine sets as the power command values thereof;

step 5), summarizing the power command values of the battery energy storage machine sets, and outputting the same to the battery energy storage power station to achieve real-time power control and energy management of the battery energy storage power station;

in the formulas (6)-(11), L is the total number of the lithium battery energy storage machine sets, and N and M are respectively the numbers of the lithium battery energy storage machine sets violating the constraint conditions of the maximum allowable discharge power and the maximum allowable charge power.

By adopting the above technical solutions, the present invention has the property of combining the charge and discharge rate properties of different types of battery energy storage machine sets and the maximum allowable working capability of the energy storage system, and has the functions of energy management and power coordinated control of the multi-type battery energy storage power station, so as to prolong the service lives of the energy storage batteries.

If the power command values of the battery energy storage machine sets in the battery energy storage power station are directly calculated only according to the total power demand of the battery energy storage power station, the state of charge values (SOC) of the battery energy storage machine sets and the maximum allowable charge and discharge power (depths) of the battery energy storage machine sets, the charge and discharge rate properties of different types of energy storage batteries may be not well considered, thereby limiting the complementary advantage of different types of battery energy storage systems and generating a defect that the battery energy storage machine sets with better charge and discharge rate properties cannot be fully used. The steps of considering the charge and discharge rate properties of different types of energy storage batteries, calculating the charge and discharge rate characteristic values of the battery energy storage machine sets at first, and effectively considering the rate characteristic values (i.e., the discharge rate characteristic values of the battery energy storage machine sets, the charge rate characteristic values of the battery energy storage machine sets and other constraint conditions) capable of representing the working capability properties of the energy storage batteries in the calculation method of the power command values of the energy storage machine sets and the energy management system of the battery energy storage power station are added in the present invention, so that the above defect is overcome, and a batter effect can be generated for allocating energy among the multi-type battery energy storage machine sets in the battery energy storage power station, which is beneficial to prolong the service lives of the energy storage batteries and delay the aging speed of the energy storage batteries.

Finally, it should be noted that the above-mentioned embodiments are merely used for illustrating the technical solutions of the present invention, rather than limiting the same, the present invention has been illustrated in detail in combination with the above-mentioned embodiments, those of ordinary skill in the art should understand that they could still make modifications or equivalent substitutions to the specific implementations of the present invention, but these modifications or variations shall fall within the protection scope of claims to be approved in the application.

What is claimed is:

1. An energy management method of a multi-type battery energy storage power station considering charge and discharge rates, comprising the following steps:

step 1), reading a total power demand value of the multi-type battery energy storage power station and controllable state values, battery rated capacity, charge state values, discharge state values, maximum allowable discharge power and maximum allowable charge power of a plurality of battery energy storage machine sets in real time;

step 2), judging a state of each multi-type battery energy storage power station according to the total power demand value of the battery energy storage power station, and further calculating a charge or discharge rate characteristic values of the plurality of battery energy storage machine sets;

step 3), calculating initial power command values of the plurality of battery energy storage machine sets based on the charge or discharge rate characteristic values of the plurality of battery energy storage machine sets;

step 4), judging whether the initial power command values of the plurality of battery energy storage machine sets exceed the maximum allowable charge or discharge power of the machine sets in real time, if the initial power command values of the plurality of battery energy storage machine sets exceed the maximum allowable charge or discharge power of the machine sets, online correcting and re-calculating the initial power command values of the plurality of battery energy storage machine sets; otherwise, setting the initial power command values of the plurality of battery energy storage machine sets as the power command values thereof; and step 5), summarizing the power command values of the plurality of battery energy storage machine sets, and outputting the same to the multi-type battery energy storage power station to achieve real-time power control and energy management of the multi-type battery energy storage power station, wherein the multi-type battery energy storage power station comprises of power type energy storage batteries and energy type energy storage batteries; and wherein the step 2) further comprises:

when the total power demand of the multi-type battery energy storage power station is a positive value, it indicates that the multi-type battery energy storage power station is at a discharge state, and then the discharge rate characteristic value of each battery energy storage machine set is a ratio of the maximum allowable discharge power of the corresponding battery energy storage machine set to the battery rated capacity of the machine set;

when the total power demand of the multi-type battery energy storage power station is a negative value, it indicates that the multi-type battery energy storage power station is at a charge state, and then the charge rate characteristic value of each battery energy storage machine set is a ratio of the maximum allowable charge power of the corresponding battery energy storage machine set to the battery rated capacity of the machine set; and when the total power demand of the multi-type battery energy storage power station is negative value, it indicates that the multi-type battery energy storage power station is at a zero power state, and then the power command values of all the plurality of battery energy storage machine sets are directly set as zero.

2. The control method of claim 1, wherein the step 3) comprises:

A) when the total power demand of the multi-type battery energy storage power station is a positive value, it indicates that the multi-type battery energy storage power station is at a discharge state, and then the initial power command value of each battery energy storage machine set is equal to multiplying a proportional value of a product of the charge state value and the discharge rate characteristic value of the corresponding battery energy storage machine set in the sum of the products of the state of charge values and the discharge rate characteristic values of all the current controllable battery energy storage machine sets by the total power demand of the multi-type battery energy storage power station;

B) when the total power demand of the multi-type battery energy storage power station is a negative value, it indicates that the multi-type battery energy storage power station is at a charge state, and then the initial power command value of each battery energy storage machine set is equal to multiplying a proportional value of a product of the discharge state value and the charge rate characteristic value of the corresponding battery energy storage machine set in the sum of the products of the state of charge values and the charge rate characteristic values of all the current controllable battery energy storage machine sets by the total power demand of the battery energy storage power station; and C) when the total power demand of the multi-type battery energy storage power station is negative value, it indicates that the multi-type battery energy storage power station is at a zero power state, and the power command values of all the energy storage machine sets are directly set as zero.

3. The control method of claim 1, wherein the method for online correcting and re-calculating the initial power command values of the plurality of battery energy storage machine sets in the step 4) comprises the following steps:

4A) initializing a counter, if the initial power command value of any one controllable battery energy storage machine set exceeds the maximum allowable discharge or charge power of the controllable battery energy storage machine set, adding 1 on the counter, and executing a step 4B; otherwise, skipping to a step 4E;

4B) selecting a battery energy storage machine set meeting judgment conditions from the plurality of battery energy storage machine sets counted by the counter through a greedy algorithm;

4C) setting the power command value of a corresponding energy storage machine set as the maximum allowable discharge or charge power value of the machine set;

4D) re-calculating the power command values of the energy storage machine sets not counted by the counter, and returning to the step 4A; and 4E) setting the initial power command values of all the battery energy storage machine sets as the power command values thereof.

4. The control method of claim 3, wherein the specific method of the step 4B is:

judgment condition J1: in the plurality of battery energy storage machine sets with the controllable state values as 1, selecting a battery energy storage machine set k having the maximum absolute value of the current maximum allowable discharge or charge power, and if only one battery energy storage machine set meets the condition, skipping to the step 4C; otherwise, continuing to execute a judgment condition J2;

judgment condition J2: when the total power demand of the multi-type battery energy storage power station is a positive value, selecting an energy storage machine set k having the maximum charge state value from the energy storage machine sets meeting the judgment condition J1, and when the total power demand of the multi-type battery energy storage power station is a negative value, selecting an energy storage machine set k having the minimum charge state value from the energy storage machine sets meeting the judgment condition J1; if only one energy storage machine set meets the condition, skipping to the step 4C; otherwise, continuing to execute a judgment condition J3; and judgment condition J3: selecting an energy storage machine set k having the maximum discharge or charge rate characteristic value from the energy storage machine sets meeting the judgment conditions J1 and J2 at the same time.

5. The control method of claim 3, wherein the power command values of the remaining battery energy storage machine sets not counted by the counter in the step 4D are calculated by the following method:

multiplying a proportional value of the maximum allowable discharge (or charge) power of the remaining controllable energy storage machine sets in the sum of the maximum allowable discharge (or charge) power of all the current controllable energy storage machine sets not counted by the counter by a difference current the current total power demand of the multi-type battery energy storage power station and the sum of the maximum allowable discharge (or charge) power of all the battery energy storage machine sets counted by the counter.

* * * * *